US010100962B2

(12) United States Patent
Boatman et al.

(10) Patent No.: US 10,100,962 B2
(45) Date of Patent: Oct. 16, 2018

(54) HIGH PRESSURE FLUID SWIVEL

(71) Applicant: SOFEC, Inc., Houston, TX (US)

(72) Inventors: L. Terry Boatman, Spicewood, TX (US); Stephane Roy, Houston, TX (US)

(73) Assignee: Sofec, Inc., Houston, TX (US)

( * ) Notice: Subject to any disclaimer, the term of this patent is extended or adjusted under 35 U.S.C. 154(b) by 229 days.

(21) Appl. No.: 15/235,781

(22) Filed: Aug. 12, 2016

(65) Prior Publication Data

US 2016/0369924 A1    Dec. 22, 2016

Related U.S. Application Data

(63) Continuation-in-part of application No. 14/178,106, filed on Feb. 11, 2014, now Pat. No. 9,605,786.

(51) Int. Cl.
F16L 39/04 (2006.01)
F16L 39/06 (2006.01)

(52) U.S. Cl.
CPC .................................. F16L 39/06 (2013.01)

(58) Field of Classification Search
CPC ............... F16L 27/0824; F16L 27/0828; F16L 27/0832; F16L 39/06
USPC ..................... 285/121.3, 121.5, 95, 351, 272
See application file for complete search history.

(56) References Cited

U.S. PATENT DOCUMENTS

| | | |
|---|---|---|
| 1,523,822 A | 1/1925 | Marret |
| 2,586,991 A | 2/1952 | Postel |
| 2,659,615 A | 11/1953 | McClain |
| 2,849,244 A | 8/1958 | Sampson |
| 3,166,344 A | 1/1965 | Davis |
| 3,175,849 A | 3/1965 | Kelly |
| 3,259,403 A | 7/1966 | Hjalsten et al. |
| 4,280,720 A | 7/1981 | Lomenech et al. |
| 4,555,118 A | 11/1985 | Saliger |
| 4,602,806 A | 7/1986 | Saliger |

(Continued)

FOREIGN PATENT DOCUMENTS

WO        199002289        3/1990

OTHER PUBLICATIONS

European Extended Search Report dated Aug. 11, 2017 for corresponding European Patent Application No. 15749672.0.

*Primary Examiner* — Aaron M Dunwoody
(74) *Attorney, Agent, or Firm* — Douglas W. Rommelmann; Bracewell LLP

(57) ABSTRACT

A fluid swivel including a stationary inner housing assembly and a rotatable outer housing operatively connected to the inner housing assembly. The outer housing includes an annular passage with upper and lower surfaces. Upper and lower seals are positioned between the inner housing assembly and the outer housing in seal recesses. A passage in the inner housing assembly provides fluid of pressure to the annular passage. The fluid exerts a first force axially inward on outer housing outer surfaces, and a larger second force axially outward on the annular passage's upper and lower surfaces. The second force is greater than the first force so upper and lower ring portions deflect outward such that the elastic axial deflections of the inner housing assembly match the axial deflections of the outer housing, thereby causing the axial clearances between the components at the upper and lower seals to remain almost the same.

23 Claims, 5 Drawing Sheets

(56) References Cited

U.S. PATENT DOCUMENTS

| | | |
|---|---|---|
| 4,662,657 A | 5/1987 | Harvey et al. |
| 4,669,758 A | 6/1987 | Feller et al. |
| 4,819,966 A | 4/1989 | Gibb |
| 4,925,219 A | 5/1990 | Pollack et al. |
| 5,242,198 A | 9/1993 | Pollack |
| 5,411,298 A | 5/1995 | Pollack |
| 6,053,787 A | 4/2000 | Erstad et al. |
| 6,070,917 A | 6/2000 | Wiebe |
| 6,086,112 A | 7/2000 | Schofield et al. |
| 6,234,540 B1 | 5/2001 | Drijver et al. |
| 6,402,202 B1 | 6/2002 | Colombo |
| 6,450,546 B1 | 9/2002 | Montgomery et al. |
| 7,556,294 B2 | 7/2009 | Schutt et al. |
| 7,614,663 B2 | 11/2009 | Brass et al. |
| 2002/0017785 A1 | 2/2002 | Omiya et al. |
| 2002/0043800 A1 | 4/2002 | Montgomery et al. |
| 2013/0099475 A1 | 4/2013 | Dalton et al. |
| 2017/0002964 A1* | 1/2017 | Boatman .................. B63B 1/00 |

\* cited by examiner

# HIGH PRESSURE FLUID SWIVEL

CROSS-REFERENCE TO RELATED APPLICATIONS

This application is a continuation-in-part of co-pending U.S. patent application Ser. No. 14/178,106, filed Feb. 11, 2014.

BACKGROUND OF THE INVENTION

1. Field of the Invention

This invention relates in general to swivel equipment for transferring fluids. In particular, the invention relates to a fluid swivel joint for a swivel stack assembly adapted for transferring fluids between tankers, storage vessels and the like and one or more conduits beneath the ocean surface. The fluid of the swivel may be product such as hydrocarbons to be transferred from the seabed to a vessel or may be water or gas to be transferred from the vessel to the seabed for well stimulation.

Still more particularly, the invention relates to a sealing arrangement for a fluid swivel joint which uses the mechanical design of the joint with the pressure of the fluid flowing through the joint to substantially prevent seal glands, and extrusion gaps in which dynamic seals are placed, from enlarging as a function of high pressure of the fluid commonly encountered on offshore loading terminals for oil and gas tankers.

2. Description of the Related Art

The offshore search for oil and gas has greatly expanded in recent years and progressed into deep rough waters such as the North Sea. To facilitate production of oil and gas from remotely located offshore fields, complex mooring systems for offshore loading terminals, which serve as centralized production sites for the entire field, have been developed. Flexible fluid lines, called risers, extend from a subsea location to the mooring site to permit the transfer of fluids between a moored vessel and a subsea location. For example, certain fluid lines may be used to convey oil and gas into the floating vessel while other fluid lines may be used to inject liquids or gases back from the vessel into subsea wells for purpose of control, well stimulation, or storage.

Floating vessels can be moored to a single point mooring system, which permits the vessel to weathervane and rotate 360° about a single mooring point. To permit the vessel to rotate and move freely without causing twisting or entanglement of the various risers to which the vessel is attached, it is necessary to provide a swivel mechanism to connect the fluid lines to the mooring site. Furthermore, since a plurality of risers are involved, it is necessary that swivels be stacked in order to have the capability of accommodating multiple fluid lines or risers.

Separate swivel assemblies are stacked on top of each other with a swivel base fixed to a stationary frame anchored to the sea floor.

Prior high pressure fluid swivels have provided an inner housing and an outer housing which is rotatably supported on the inner housing by a bearing so that the outer housing is free to rotate about the inner housing. An annular conduit chamber or passage is formed between the two housings when the two housings are placed in registration with each other. An inlet from the inner housing communicates with the chamber, and an outlet in the outer housing communicates with the chamber. Upper and lower dynamic seals in the form of face seals or radial seals are placed in grooves or gaps between co-axially opposed or radially opposed surfaces of the inner and outer housings to prevent fluid from leaking past the two facing surfaces while the high pressure fluid is present in the chamber.

When high pressure is present in the inlet and passes through the annular passage and out the outlet, the pressure in the passage acts to separate the inner housing and the outer housing from each other. In other words, the inner housing is forced to contract radially inward as a consequence of the force generated by the fluid pressure acting on an effective area between the two dynamic seals; the outer housing is forced to expand radially outward by the force of the fluid pressure acting on an effective area between the upper and lower dynamic seals. Separation occurs between the facing surfaces as a result of high fluid pressure in the chamber. High pressure as used herein is meant to be at the level of 2,000 psi and above.

As the pressure of flowing fluid increases, the separation between the facing surfaces in which the seals are placed increases. Such separation can be large enough, due to the high fluid pressures, so as to prevent leak-free operation of the swivel at the high pressures by seal extrusion failure.

Swivel component deformation has been the subject of much effort by prior developers. The prior art has considered the idea of adding more material to the swivel components so that deformation as a function of pressure—especially high pressure in the 5,000 to 10,000 psi range—will resist deflection. With high pressures, however, the swivel components, i.e., the inner and outer housings, become so large and heavy that they are disadvantageous from weight, cost, handling, and size standpoints, and without necessarily achieving the desired extrusion gap control.

The prior art discloses swivels that use exterior pressure sources to apply balancing or "barrier" fluid pressure at the dynamic seal interface. Examples of such "active" pressure compensation for dynamic seal gap control are shown in U.S. Pat. No. 4,602,806 to Saliger; U.S. Pat. No. 4,669,758 to Feller et al., U.S. Pat. No. 5,411,298 to Pollack; U.S. Pat. No. 6,053,787 to Erstad et al., and U.S. Pat. No. 4,662,657 to Harvey et al. All of these patents disclose separate anti-extrusion rings above and below the annular fluid passage in combination with active pressure compensation.

U.S. Pat. No. 4,555,118 to Salinger discloses, at FIG. 4, a free floating anti-extrusion ring placed above and below an annular passage between inner and outer rings. The free floating anti-extrusion ring is initially displaced (i.e., at zero pressure) from the inner joint ring by a small seal extrusion gap. In operation, the internal pressure of the pressurized fluid in the annular passage is transmitted to the outer side of the anti-extrusion ring such that the pressure differential across the seal presses the anti-extrusion ring against the outer surface of the inner ring. In other words, the seal extrusion gap width varies as a function of internal pressure. Metal to metal contact of the anti-extrusion ring with the annular surface of the inner ring can cause friction and scoring problems during operation.

U.S. Pat. No. 4,819,966 to Gibb, at FIGS. 2, 3 and 4, shows an annular ring having an annular groove which registers with the inlet of an inner housing. An annular chamber is formed outwardly in the annular ring such that upper and lower lips are created in the annular ring that face the exterior surface of the inner housing. The lips carry dynamic seals and are forced into sealing engagement about the cylindrical surface of the inner housing above and below the inlet when pressure is in the chamber. A constant radial seal gap is maintained as a function of pressure by proper shaping of the chamber and the ring and the lip. A lubricating system may also be provided for injecting a controlled fluid.

U.S. Pat. No. 6,450,546 to Montgomery and Roy shows a sealed fluid joint for a fluid swivel in which a pressure balanced middle housing ring is mounted between an inner housing and outer housing ring. Pressure balance is achieved by providing an inner annulus chamber or cavity between the inner housing and middle housing ring and an outer annulus chamber or cavity between the middle and outer housing ring. Holes or passages through the middle housing ring fluidly connect the inner and outer chambers. Dynamic seals are placed in seal glands between the inner housing and middle housing ring. Static seals are placed in seal glands between the middle and outer housing rings. The arrangement transfers component deformation due to product fluid pressure from the dynamic seal interface to the static seal interface by exposing fluid product pressure to a smaller effective area at the dynamic seals on the inner side of the middle housing ring than an effective area at the static seals on the outer side of the middle housing ring. The counter forces generated by the product fluid pressure over two different effective areas on the middle housing ring deforms the middle housing ring radially in a predetermined direction and amount as a function of increasing pressure. Control of radial deformation of the middle housing ring is passive, because it depends on a geometrical arrangement of dynamic and static seals on both sides of the middle housing ring and is proportional to the product fluid pressure.

A primary aspect of the invention is to provide a fluid swivel arrangement that is capable of flowing high pressure product through it while minimizing product leaking past dynamic seal recesses formed between inner and outer housings.

Another aspect of the invention is to provide a fluid swivel arrangement for a predetermined high pressure rating, path diameter, and arrangement and shape of the components that minimizes the swivel outside diameter, height, and weight.

Another aspect of the invention is to provide shapes and arrangements of inner and outer housings with seals between them that minimize relative internal deflections so as to assume proper function and long life of the seals.

Another aspect of the invention is to provide a fluid swivel arrangement with inner and outer housings arranged so that internal areas subjected to high fluid pressure are minimized, thereby allowing the parts to be reduced in size and weight.

Another aspect of the invention is to provide dynamic upper and lower seal recesses in the outer housing with face seals placed therein where the seal recesses are arranged concentrically outward from the axial center line of the fluid swivel, with the shape of an annular passage in the outer housing compensating for the tendency of clearances behind the seals to open wider axially as high pressure acts inside the swivel.

Another aspect of the invention is to match the bending stiffness of the inner housing with the bending stiffness of the outer housing such that elastic matching occurs with the inner and outer housings expanding about the same amount in the same direction when high pressure fluid is carried by the swivel, so that the inner and outer housings effectively move together with increasing pressure and the clearance between the parts remains almost the same.

Another aspect of the invention is to size or proportion the dimensions of the structural components of the swivel such that the elastic axial deflections of the tightly assembled together inner housing and seal plate will match the axial deflections of the outer housing's upper and lower ring portions, thereby causing the axial clearances between the parts at the upper and lower seals to remain almost the same.

SUMMARY OF THE INVENTION

A preferred embodiment of the present invention is a rotatable high pressure sealed joint for a fluid swivel having an outer housing and an inner housing assembly comprising an inner housing and a seal plate. The outer housing includes a radially inward-facing annular passage internally pressurized with high pressure fluid. The radially inward-facing annular passage defines upper and lower ring portions of the outer housing. Two or more dynamic seals are disposed above the upper ring portion and two or more dynamic seals are disposed below the lower ring portion of the outer housing. Dynamic seals are contained by seal grooves or recesses in the outer housing and are in compressed contact with the opposing flat annular surfaces on the seal plate and inner housing. The pressurized internal surfaces of the outer housing annular passage are designed and arranged with respect to the pressurized outer surface area of the upper ring portion and pressurized outer surface area of the lower ring portion so that the upper and lower ring portions elastically deflect upward and downward, respectively, with increasing pressure to compensate for the axially outward elastic deflection of the tightly assembled together inner housing and seal plate. The upward and downward deflection of the outer housing ring portions is the result of having more axial pressure force urging the rings to expand vertically outward than the inward compression pressure force on the smaller radial width of the pressure area between the seal inside diameter and inside diameter of the inner housing. The desired minimum axial net resulting force acting on the outer housing is established by the selection of effective seal diameters and radial and axial dimensions of the annular passage.

In other embodiments, the seal recesses and their opposite flat annular sealing surfaces can be arranged in other combinations with the same sealing function result such as locating some or all of the seal recesses on the inner housing and some or all on the seal plate. The mating annular sealing surface for each seal is then located on the opposite housing or seal plate.

The rotatable fluid swivel is further characterized by the outer housing having a radial flow outlet with an internal diameter in communication with the annular passage. The outer housing annular passage is characterized by an internal height and a width. The internal height of the annular passage is sized to be from 50% to 60% of the internal diameter of the radial flow outlet. The width of the annular passage is sized to be about twice the internal height of the annular passage. So sized and arranged, the height of the radial pressure area, bounded by the upper and lower dynamic seals on the outer housing, minimizes the radial pressure force thereby reducing the required outside diameter and weight of the outer housing. Likewise the inward radial pressure force acting on the inner housing is reduced which beneficially reduces the compressive stresses and elastic deflections of the inner housing.

BRIEF DESCRIPTION OF THE DRAWINGS

The advantages and features of the invention will become more apparent by reference to the drawings which are appended hereto, wherein like reference numbers indicate like parts, and wherein an illustrative embodiment of the invention is shown, of which.

DESCRIPTION OF THE INVENTION

Figure 1:
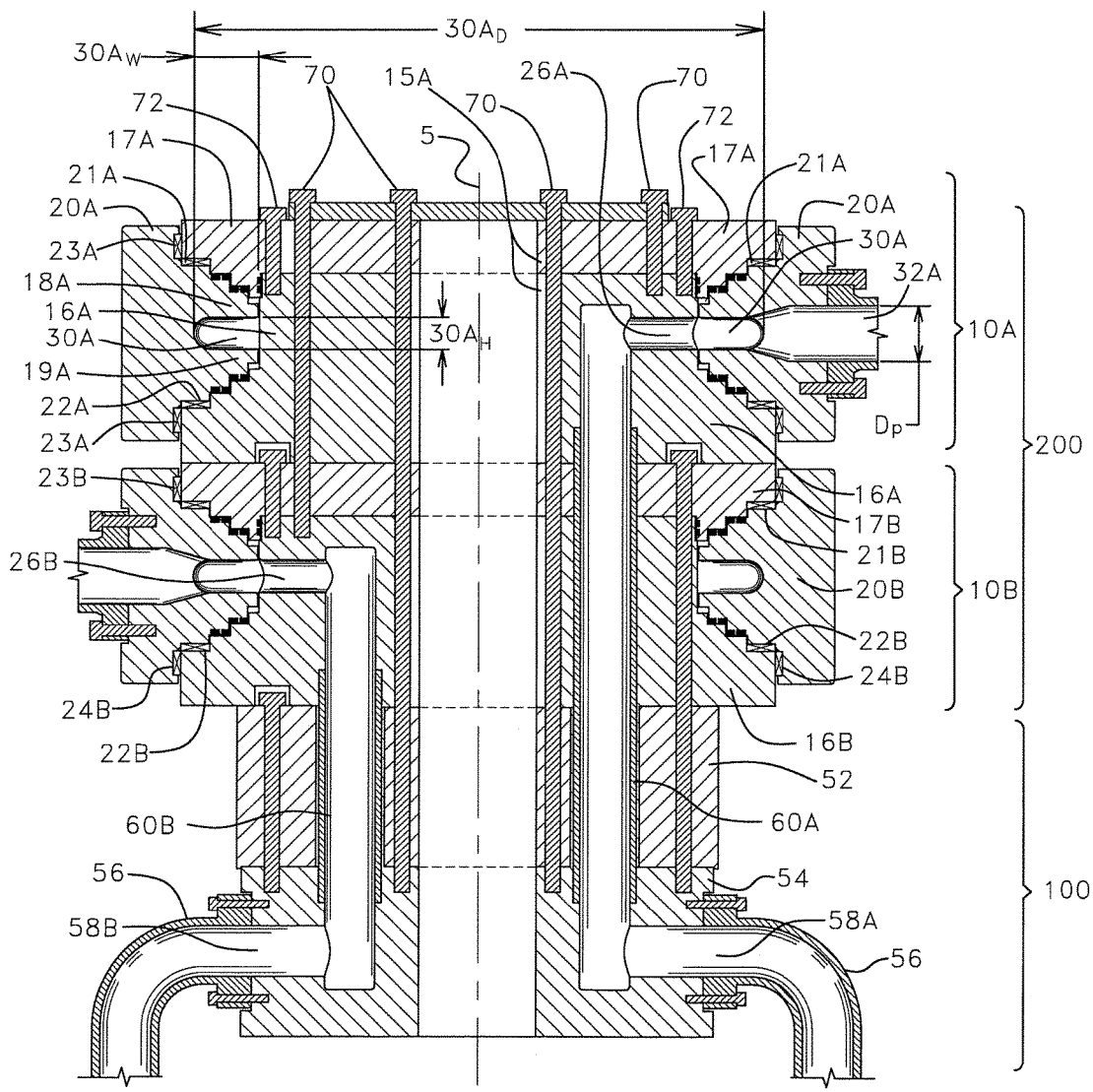
FIG. 1 is a cross section of an illustrative swivel stack assembly with two swivels, each according to a preferred embodiment of the invention, stacked on a swivel base with one inlet of the base fluidly coupled to an outlet of one swivel and a second inlet of the base fluidly coupled to an outlet of a second swivel.

The aspects, features, and advantages of the invention mentioned above are described in more detail by reference to the drawings wherein like reference numerals represent like elements. The following table provides a list of reference numerals used throughout the specification and the features that they represent:

| Reference Numeral | Feature | FIGS. where Reference Numeral Appears |
|---|---|---|
| 5 | Longitudinal axis | 1, 2 |
| 10A | Upper swivel | 1, 3, 4, 5 |
| 10B | Lower swivel | 1 |
| 15A | Upper swivel inner housing assembly | 1, 4 |
| 16A | Upper swivel inner housing | 1, 3, 4, 5 |
| 16B | Lower swivel inner housing | 1 |
| 17A | Upper swivel seal plate | 1, 3, 4, 5 |
| 17B | Lower swivel seal plate | 1 |
| 18A | Upper ring portion | 1, 4, 5 |
| 19A | Lower ring portion | 1, 4, 5 |
| 20A | Upper swivel outer housing | 1, 3, 4, 5 |
| 20B | Lower swivel outer housing | 1 |
| 21A | Upper swivel upper axial bearing | 1, 3, 4 |
| 21B | Lower swivel upper axial bearing | 1 |
| 22A | Upper swivel lower axial bearing | 1, 3, 4 |
| 22B | Lower swivel lower axial bearing | 1 |
| 23A | Upper swivel upper radial bearing | 1, 3, 4 |
| 23B | Lower swivel upper radial bearing | 1 |
| 24A | Upper swivel lower radial bearing | 1, 3, 4 |
| 24B | Lower swivel lower radial bearing | 1 |
| 26A | Upper inner housing passage | 1 |
| 26B | Lower inner housing passage | 1 |
| 30A | Upper swivel annular passage | 1, 3, 4 |
| $30A_D$ | Upper swivel annular passage internal diameter | 1 |
| $30A_H$ | Upper swivel annular passage internal height | 1 |
| $30A_W$ | Upper swivel annular passage radial width | 1 |
| 32A | Upper swivel radial flow outlet | 1, 2, 3 |
| 40 | First upper dynamic seal | 3, 4, 5 |
| 40A | First upper seal recess | 4 |
| 41 | First lower dynamic seal | 3, 4, 5 |
| 41A | First lower seal recess | 4 |
| 42 | Second upper dynamic seal | 3, 4, 5 |
| 42A | Second upper seal recess | 4 |
| 43 | Second lower dynamic seal | 3, 4, 5 |
| 43A | Second lower seal recess | 4 |
| 44 | Third upper dynamic seal | 3, 4, 5 |
| 44A | Third upper seal recess | 4 |
| 45 | Third lower dynamic seal | 3, 4, 5 |
| 45A | Third lower seal recess | 4 |

-continued

| Reference Numeral | Feature | FIGS. where Reference Numeral Appears |
|---|---|---|
| 46 | Fourth upper dynamic seal | 3, 4, 5 |
| 46A | Fourth upper seal recess | 4 |
| 47 | Fourth lower dynamic seal | 3, 4, 5 |
| 47A | Fourth lower seal recess | 4 |
| 52 | Swivel spacer | 1 |
| 52A | Upper clearance gap | 4, 5 |
| 52B | Lower clearance gap | 4, 5 |
| 54 | Base manifold | 1 |
| 56 | Manifold connection pipes | 1 |
| 58A | Upper swivel manifold passage | 1 |
| 58B | Lower swivel manifold passage | 1 |
| 60A | Upper pipe | 1, 2 |
| 60B | Lower pipe | 1, 2 |
| 61 | First upper annular surface | 4 |
| 62 | First lower annular surface | 4 |
| 63 | Second upper annular surface | 4 |
| 64 | Second lower annular surface | 4 |
| 70 | Threaded bolts | 1 |
| 72 | Threaded bolts | 1 |
| 98 | First static seal | 4, 5 |
| 99 | Second static seal | 4, 5 |
| 100 | Swivel base | 1 |
| 105 | Clearance gap | 4 |
| 120 | Torque reaction arm | 2 |
| 200 | Swivel stack | 1, 2 |
| $A_l$ | Lateral component of the circumferential sealed area of the outer housing | 4 |
| $D_P$ | Internal diameter of radial flow outlet | 1 |
| $F_H$ | Horizontal force acting on outer housing | 4 |
| $F_{v1}$ | Inward vertical force acting on outer housing | 4 |
| $F_{v2}$ | Outward vertical force acting on outer housing | 4 |
| $H_{eff}$ | Effective height | 5 |
| P | Pressure in annular passage | 4, 5 |

The invention is for a novel high pressure swivel where two of the novel swivels are illustrated in FIG. 1 vertically secured together. Two swivels, including upper swivel 10A and lower swivel 10B of swivel stack 200 are shown stacked on top of a fixed swivel base 100. Two swivels are shown for illustrative purposes in FIG. 1, but a single swivel could be provided or three or more swivels may be stacked together. As shown in FIG. 1, an upper swivel inner housing 16A, and a lower swivel inner housing 16B are secured by bolts 70, or other fastening means such as segmented clamps, extending from the upper swivel 10A into and through lower swivel 10B, through swivel spacer 52 and into base manifold 54.

The swivel base 100 is fixed to a substantially geostationary point (not shown) of an offshore mooring terminal. Manifold connection pipes 56, arranged and designed to carry high pressure fluids, are connected to the base manifold 54 and fluidly communicate with manifold passages 58A, 58B of base manifold 54. Of course other connection pipes can be provided about the circumference of the base manifold 54 to provide fluid communication to other swivels in a stack. An upper pipe 60A provides fluid communication between base manifold passage 58A and upper inner housing passage 26A of upper swivel 10A. Lower pipe 60B provides fluid communication between base manifold passage 58B and lower inner housing passage 26B of lower swivel 10B. Pipes 60A, 60B are spaced about a longitudinal axis 5 of the stack of swivels.

Upper swivel 10A is constructed with an upper swivel inner housing assembly 15A having an inner housing 16A and a seal plate 17A attached to the top of the inner housing 16A by means of threaded bolts 72. Upper swivel outer housing 20A is rotatively carried on the inner housing assembly 15A by means of upper swivel upper and lower axial bearings 21A and 22A, and upper swivel upper and lower radial bearings 23A and 24A.

As illustrated in FIG. 1, the lower swivel 10B may be constructed similarly to upper swivel 10A, with the two swivel assemblies connected together. Lower swivel 10B may be constructed much like upper swivel 10A with lower swivel upper and lower axial bearings 21B and 22B, and lower swivel upper and lower radial bearings 23B and 24B, providing rotational support of the lower swivel outer housing 20B to the lower swivel inner housing 16B and lower swivel seal plate 17B. As mentioned above, upper swivel 10A and lower swivel 10B are coupled together, and to the base manifold 54, by threaded bolts 70 or other means. Although much of the following disclosure references upper swivel 10A and its parts, it is to be understood that the features and principles discussed apply equally to the lower swivel 10B. In addition, a swivel stack 200 according to the present invention may have additional swivels, each sharing features and characteristics in common with those discussed herein.

In the upper swivel 10A, a radial flow outlet 32A in the upper swivel outer housing 20A is radially aligned with an annular passage 30A, which extends circumferentially about the upper swivel outer housing 20A. When upper swivel outer housing 20A turns about upper swivel inner housing assembly 15A, annular passage 30A is always in fluid communication with the inner housing passage 26A of the upper swivel 10A, which fluidly connects to pipe 60A and base manifold passage 58A. Referring to FIG. 1, the annular passage 30A has an outer diameter $30A_D$ and an internal height $30A_H$ sized to be from 50% to 60% of an internal diameter $D_P$ of the radial flow outlet 32A. A radial width $30A_W$ of the annular passage 30A, as measured from a radially inward-facing annular surface of the outer housing 20A, is sized to be about twice the internal height $30A_H$ of the annular passage 30A.

Figure 2:
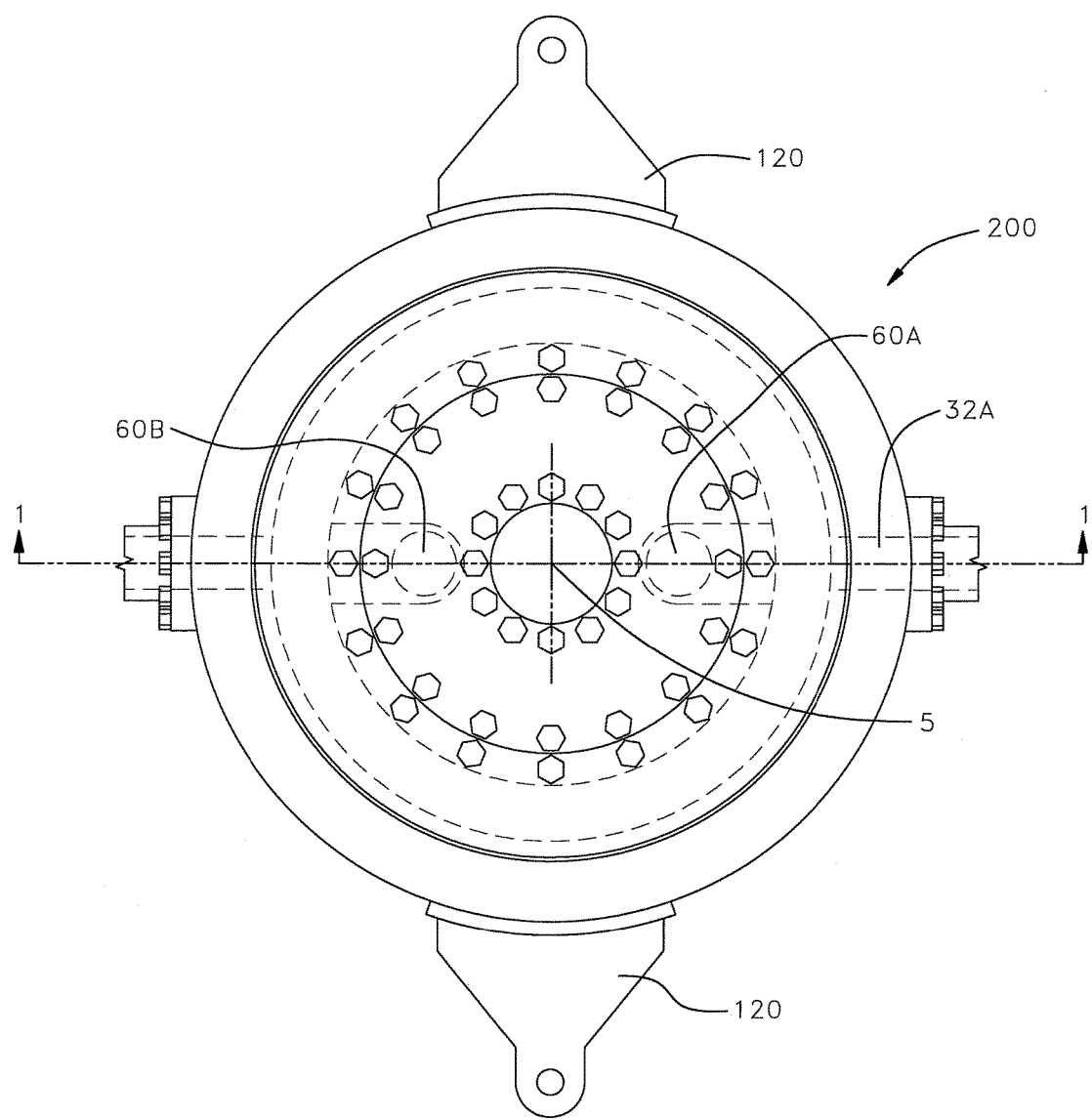
FIG. 2 is a top view of the swivel stack assembly of FIG. 1 with section line 1-1 indicating the cross-sectional view of the swivel stack assembly of FIG. 1.

FIG. 2 is a top view of the swivel stack of an embodiment of the present invention. Pipes 60A, 60B are positioned 180° or any chosen angle from each other. A single radial flow outlet 32A is illustrated for fluid communication with pipe 60A, but multiple radial flow outlets can be provided about the outer housing. Torque reaction arms 120 may be mounted to the outer housings 20A and 20B. Preferably, the torque reaction arms 120 are connected to the weathervaning floating vessel by link arms (not shown) which forces the outer housings 20A and 20B to rotate with the floating vessel.

Figure 3:
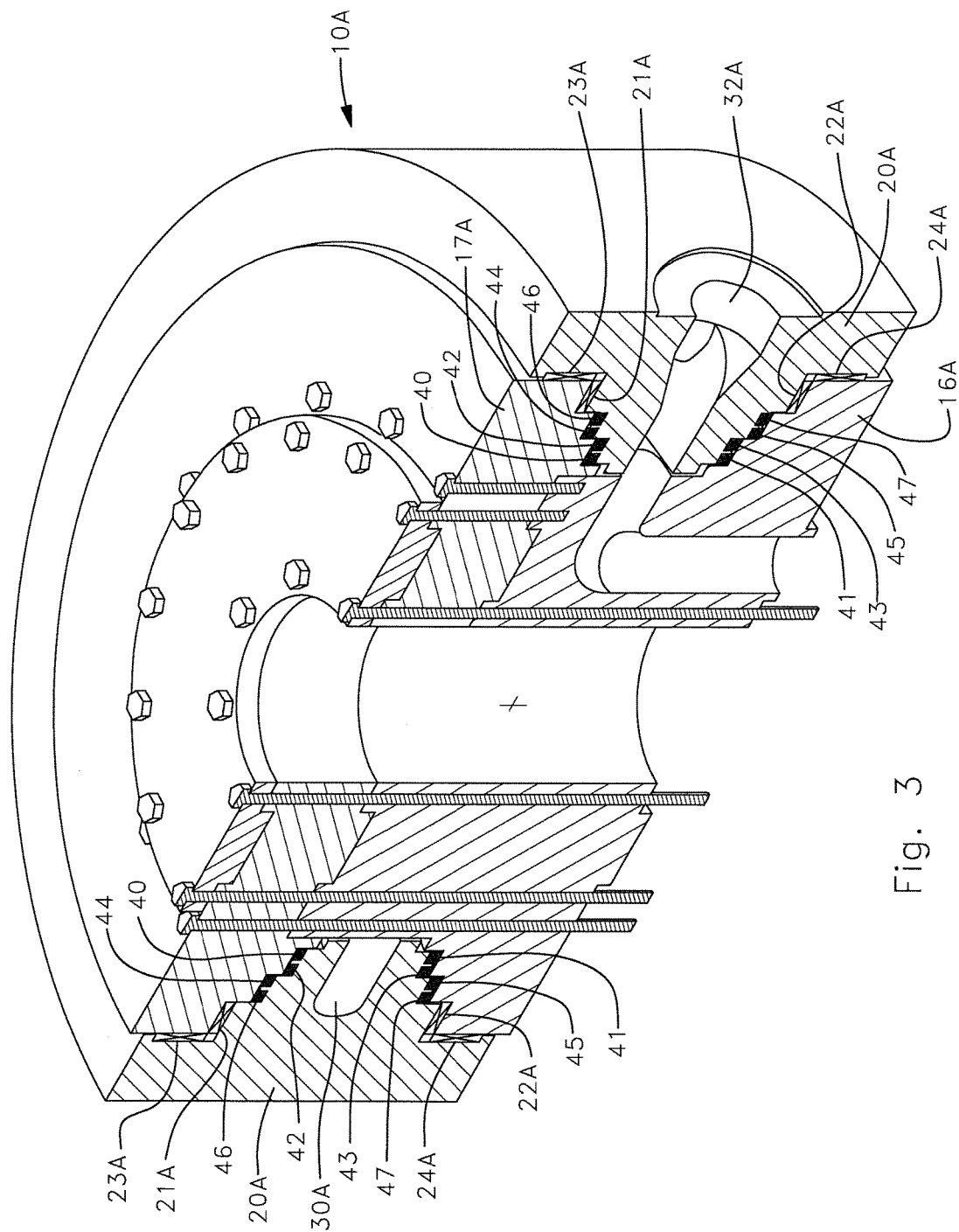
FIG. 3 is a perspective view in cross-section of a swivel according to an embodiment of the invention.

FIG. 3 is a perspective view of the upper swivel 10A in cross-section illustrating the upper swivel inner housing 16A and upper swivel seal plate 17A in registration with the upper swivel outer housing 20A and rotatively supported thereto by axial bearings 21A and 22A, as well as radial bearings 23A and 24A. Dynamic seal pairs 40, 42; 41, 43; 44, 46; 45, 47 provide sealing of the inner and outer housings in response to high pressure fluid in inner housing passage 26A and annular passage 30A.

Figure 4:
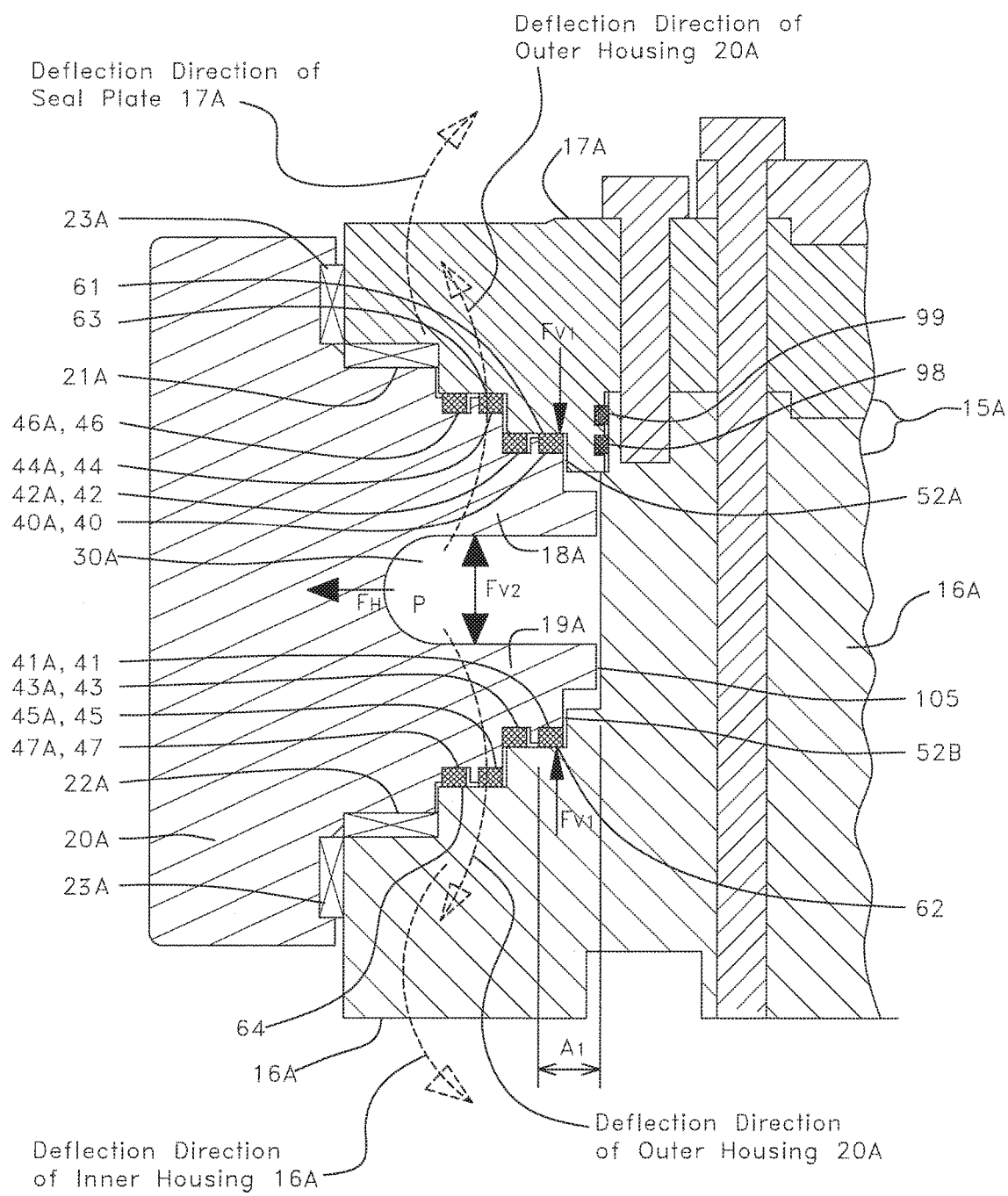
FIG. 4 is an enlarged sectional view showing stair stepped dynamic face seals between inner and outer housings with an annular passage in the outer housing, with arrows showing forces on the swivel components caused by pressure in the swivel.

FIG. 4 shows an enlarged partial cross-section of the upper swivel 10A, including upper swivel inner housing components 16A and 17A, and upper swivel outer housing 20A rotatively supported by upper swivel upper and lower axial bearings 21A, 22A, and upper swivel radial bearings 23A and 24A. Static seals 98, 99 are positioned between inner housing 16A and seal plate 17A to prevent high pressure fluid in annular passage 30A from passing therebetween. Inner housing assembly components 16A and 17A are static; they are bolted together and move together as one unit. A first set of upper and lower annular dynamic face seals 40, 41 are placed in first upper and lower seal recesses 40A, 41A, respectively. A backup second set of upper and lower annular dynamic face seals 42, 43 are placed in second upper and lower seal recesses 42A, 43A, which are of greater diameter than the first upper and lower seal recesses 40A, 41A. The first and second upper seals 40 and 42 sealingly engage a flat first upper annular surface 61 of the seal plate 17A and the first and second lower seals 41 and 43 sealingly engage a flat first lower annular surface 62 of the inner housing 20A.

FIG. 4 further illustrates the forces on the upper swivel outer housing 20A caused by high fluid pressure in annular passage 30A, as well as the clearance gap 105 between upper swivel inner housing assembly 15A and upper swivel outer housing 20A. FIG. 4 exaggerates clearance gap 105 to illustrate that high pressure acts against dynamic seals 40 and 41, including against surfaces defining upper and lower clearance gaps 52A and 52B, to force dynamic seal 40 against first upper annular surface 61 and to force dynamic seal 41 against first lower annular surface 62. An inward vertical force $F_{v1}$ is applied behind dynamic seals 40 and 41 toward the upper swivel outer housing 20A by virtue of the fluid pressure. The total inward force $F_{v1}$ is equal to the fluid pressure P times the circumferential sealed area of the outer housing, the lateral component of which is identified as $A_1$ in FIG. 4.

The radially inward-facing annular passage 30A defines upper and lower ring portions 18A and 19A of the outer housing 20A. The annular passage 30A is shaped so as to cause the upper and lower ring portions 18A and 19A, which face opposite to the dynamic seals 40, 41, to deflect outward and spread apart under the force of pressure P in the annular passage 30A. See the arrows labeled "DEFLECTION DIRECTION" of FIG. 4. These deflections partially and sufficiently compensate for any detrimental upward deflection of the upper swivel seal plate 17A above and lower deflection of the upper swivel inner housing 16A below.

The outward deflections of upper and lower ring portions 18A, 19A are caused by pressure P acting on the surfaces of annular passage 30A. The circumferential area of the surfaces of the annular passage 30A on which the pressure P acts, or circumferential passage area, is designed to be greater than the circumferential seal area $A_1$ discussed above. The outward vertical force $F_{v2}$, which is generated by pressure P, acts to elastically deflect the upper and lower ring portions 18A, 19A in opposition to inward force $F_{v1}$. The force $F_{v2}$ is greater than $F_{v1}$. The net force $F_{v2}-F_{v1}$ deflects the upper ring portion 18A outward and upward and the lower ring portion 19A outward and downward. As a result, the metal-to-metal clearances of the seal recesses 40A, 42A to annular surface 61, seal recesses 41A, 43A to annular surface 62, seal recesses 44A, 46A to annular surface 63, and seal recesses 45A, 47A to annular surface 64 remain substantially constant with pressure increasing to very high levels. Opposite from the pressurized side of each seal are small (almost too small to be easily seen in the figures) metal-to-metal spaces or gaps between stationary inner housing 16A, or seal plate 17A, and rotating outer housing 20A. This gap is small, in the range of 0.4 to 1.2 millimeters, and it is crucial that these surfaces never close together to touch and cause very expensive damage to the metal parts. Also it is crucial that the gaps do not increase excessively under pressure such that the seals fail by high pressure extrusion into these gaps.

A horizontal force $F_H$ causes upper swivel outer housing 20A to deflect outwardly but has little effect on the clearances at annular surfaces 61, 63 and 62, 64.

Figure 5:
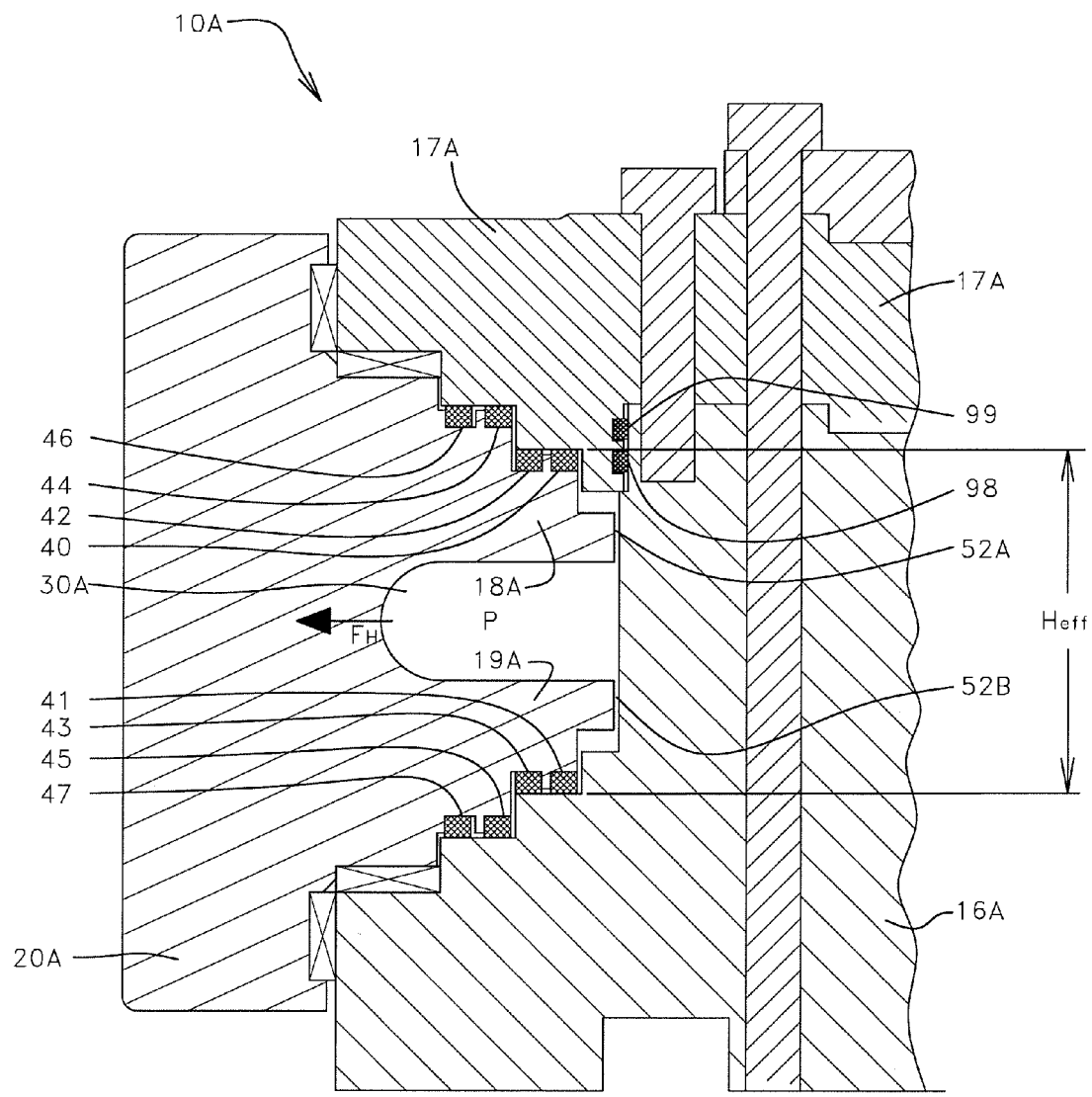
FIG. 5 is another diagrammatic illustration of FIG. 4 showing effective pressure height area in the swivel according to the invention.

FIG. 5 is the same cross section of a portion of a swivel, but illustrates the shortened radial internal pressure height, or effective height $H_{eff}$, on which fluid pressure in the swivel is acting. This tends to force upper swivel outer housing 20A radially outwardly from the upper swivel inner housing components 16A, 17A. The effective height $H_{eff}$ of the pressure area on which pressure P is acting is the height acting around annular passage 30A of the outer housing and upper and lower clearance gaps 52A and 52B. The area is reduced by the placement of seals in a stair-step arrangement, bringing them as close together as practical. A reduction in the pressure area results in a reduction of the compressive load and stresses in the inner housing. Further, the reduced effective height $H_{eff}$ reduces the radial force applied to the upper swivel outer housing 20A so that its diameter and weight can be reduced, resulting in a lighter, smaller swivel.

Additional Features

The invention embodied in the swivel illustrated in FIGS. 1-5 is characterized by additional features, including:

(1) The dynamic seals discussed above may include as primary seals the first upper seal 40, first lower seal 41, a second upper seal 42, and second lower seal 43 to seal between upper swivel inner housing components 16A, 17A and outer housing 20A. See FIGS. 4 and 5. A secondary seal system, including an third upper seal 44, a third lower seal 45, a fourth upper seal 46, and fourth lower seal 47 may also be provided. The third and fourth upper seals 44 and 46 are placed in third and fourth upper seal recesses 44A and 46A, respectively, which are of greater diameter than the first and second upper seal recesses 40A and 42A. The third and fourth upper seals 44 and 46 sealingly engage a flat second upper annular surface 63 of the seal plate 17A. The third and fourth lower seals 45 and 47 are placed in third and fourth lower seal recesses 45A and 47A, respectively, which are of greater diameter than the first and second lower seal recesses 41A and 43A. The third and fourth lower seals 45 and 47 sealingly engage a flat second lower annular surface 64 of the inner housing 16A.

(2) The static seals of FIGS. 4 and 5 may include a primary static seal 98 and a secondary static seal 99.

Separate oil barrier systems may be provided on the primary dynamic seals 40, 42 and 41, 43 and on the secondary dynamic seals 44, 46, and 45, 47.

(3) The annular passage 30A in the upper swivel outer housing 20A is wide and of short height, as illustrated in FIG. 4, with the height being about 50% to 60% of the internal diameter $D_P$ of the radial flow outlet 32A. As described above, the dynamic seals 40, 42; 41, 43; 44, 46; 45, 47 are preferably placed as close together as practical in a stair step arrangement. Such geometries contribute to the reduction of pressure height in the area acting on the upper swivel outer housing 20A. (See, e.g., effective height $H_{eff}$ in FIG. 5). With a predetermined internal pressure rating, that pressure acts on a smaller pressure area, resulting in a smaller radial force. As a consequence, the diameter and weight of the outer housing is reduced, compared to prior swivels of the same pressure rating. The shorter effective pressure height $H_{eff}$ area also reduces the compressive load and stresses in the upper swivel inner housing components 16A and 17A.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

What is claimed is:

1. A sealed fluid swivel comprising:
   an inner housing assembly positioned coaxially about a longitudinal axis;
   an outer housing positioned coaxially about the inner housing assembly and arranged and designed to rotate relative to the inner housing assembly about the longitudinal axis, the outer housing including:
      a radially inward-facing annular surface defining an innermost diameter of the outer housing;
      a radially inward-facing annular passage having a radial width, an axial height, and an outer diameter, the radial width of the annular passage defining upper and lower ring portions of the outer housing;
      first upper and lower annular seal recesses, the first upper annular seal recess formed in the upper ring portion and the first lower annular seal recess formed in the lower ring portion, the first annular seal recesses having a first seal recess diameter;
   an upper seal disposed in the first upper annular seal recess and a lower seal disposed in the first lower annular seal recess, the upper and lower seals for sealing between the outer housing and annular, axially-facing surfaces of the inner housing assembly,
   wherein a small axial clearance exists between the inner housing assembly and the ring portions at the upper and lower seals;
   the inner housing assembly including an inner housing passage communicating with the annular passage, the inner housing passage arranged to carry fluid having a fluid pressure to the annular passage, the fluid allowed to fill a small space between the inner housing assembly and the outer housing ring portions from the radially inward-facing annular surface of the outer housing to the upper and lower seals,
   wherein the fluid pressure exerts a force on the inner housing assembly resulting in elastic axial deflections of the inner housing assembly and the fluid pressure also exerts a force on the upper and lower ring portions resulting in elastic axial deflections of the upper and lower ring portions such that the small axial clearance between the inner housing assembly and the ring portions at the upper and lower seals remains substantially the same.

2. The fluid swivel of claim 1, wherein the first seal recess diameter is less than the annular passage outer diameter.

3. The fluid swivel of claim 1, wherein:
   the outer housing has at least two axial thrust bearings between radially extending annular surfaces of the outer housing and the inner housing assembly; and
   the fluid swivel has at least one radial bearing between axially extending surfaces of the inner housing assembly and the outer housing.

4. The fluid swivel of claim 1, wherein the upper and lower seals are dynamic seals.

5. The fluid swivel of claim 4, wherein the upper and lower seals are face seals.

6. The fluid swivel of claim 1, further comprising:
   second upper and lower annular seal recesses which are substantially adjacent to the first upper and lower annular seal recesses but are formed at an increased diameter in the outer housing, the increased diameter is less than the annular passage outer diameter; and second upper and lower dynamic seals disposed respectively in the second upper and lower annular seal recesses.

7. A sealed fluid joint comprising:
an inner housing assembly positioned coaxially about a central longitudinal axis and having an inner housing passage;
an outer housing positioned coaxially about the inner housing assembly, the outer housing arranged and designed to rotate relative to the inner housing assembly about the central longitudinal axis, the outer housing having a radially inward-facing annular groove in fluid communication with the inner housing passage, the radially inward-facing groove defining upper and lower ring portions of the outer housing;
upper and lower annular seal recesses, the upper annular seal recess formed in one of the upper ring portion and the inner housing assembly and the lower annular seal recess formed in one of the lower ring portion and the inner housing assembly, the upper annular seal recess having a first upper seal recess diameter and the lower annular seal recess having a first lower seal recess diameter;
an upper annular seal disposed in the upper annular seal recess and a lower annular seal disposed in the lower annular seal recess, the upper and lower annular seals sealing between the inner housing assembly and the outer housing,
wherein a small axial clearance exists between the inner housing assembly and the outer housing at the upper and lower seals;
the inner housing passage communicating with the annular passage, the inner housing passage arranged to carry fluid having a fluid pressure to the annular passage, the fluid allowed to fill a small space between the inner housing assembly and the outer housing ring portions from the radially inward-facing annular surface of the outer housing to the upper and lower seals,
wherein the fluid pressure exerts a force on the inner housing assembly resulting in elastic axial deflections of the inner housing assembly and the fluid pressure also exerts a force on the upper and lower ring portions resulting in elastic axial deflections of the upper and lower ring portions such that the small axial clearance between the inner housing assembly and the outer housing at the upper and lower seals remains substantially the same.

8. The sealed fluid joint of claim 7, wherein the annular passage has an outer diameter and the first upper and lower seal recess diameters are less than the annular passage outer diameter.

9. The sealed fluid joint of claim 7, wherein:
the outer housing has at least two axial thrust bearings between radially extending annular surfaces of the outer housing and the inner housing assembly; and
the fluid swivel has at least one radial bearing between axially extending surfaces of the inner housing assembly and the outer housing.

10. The sealed fluid joint of claim 7, wherein the upper and lower seals are dynamic seals.

11. The sealed fluid joint of claim 10, wherein the upper and lower seals are face seals.

12. The sealed fluid joint of claim 8, further comprising:
second upper and lower annular seal recesses which are substantially adjacent to the first upper and lower annular seal recesses but are formed at an increased diameter in the outer housing, the increased diameter is less than the annular passage outer diameter; and
second upper and lower dynamic seals disposed respectively in the second upper and lower annular seal recesses.

13. The sealed fluid joint of claim 7, wherein the inner housing assembly comprises an inner housing and a seal plate securely fastened to the inner housing.

14. A sealed fluid swivel comprising:
an inner housing assembly positioned coaxially about a longitudinal axis;
an outer housing positioned coaxially about the inner housing assembly and arranged and designed to rotate relative to the inner housing assembly about the longitudinal axis, the outer housing including:
a radially inward-facing annular surface defining an innermost diameter of the outer housing;
a radially inward-facing annular passage having a radial width, an axial height, and an outer diameter;
first upper and lower annular seal recesses, the first upper annular seal recess is above the annular passage and the first lower annular seal recess is below the annular passage, the first annular seal recesses having a first seal recess diameter;
wherein the first seal recess diameter is less than the annular passage outer diameter,
an upper seal disposed in the first upper annular seal recess and a lower seal disposed in the first lower annular seal recess, the upper and lower seals for sealing between the outer housing and annular, axially-facing surfaces of the inner housing assembly;
the inner housing assembly including an inner housing passage communicating with the annular passage, the inner housing passage arranged to carry fluid having a fluid pressure to the annular passage, the fluid allowed to fill a small space between the inner housing assembly and the outer housing from the radially inward-facing annular surface defining the innermost diameter of the outer housing to the upper and lower seals,
wherein each of the upper and lower seals defines a circumferential axially-facing outer surface area of the outer housing from the innermost diameter to the first seal recess diameter, and the annular passage having upper and lower circumferential passage areas defined by the passage width, the circumferential passage areas being greater than the circumferential axially-facing outer surface areas of the outer housing;
wherein the fluid pressure acting on the upper and lower circumferential passage areas and the circumferential axially-facing outer surface areas of the outer housing results in net forces acting axially outwardly causing a small axial outward deflection of the outer housing.

15. The fluid swivel of claim 14, wherein:
the outer housing has at least two axial thrust bearings between radially extending annular surfaces of the outer housing and the inner housing assembly; and
the fluid swivel has at least one radial bearing between axially extending surfaces of the inner housing assembly and the outer housing.

16. The fluid swivel of claim 14, wherein the upper and lower seals are dynamic seals.

17. The fluid swivel of claim 16, wherein the upper and lower seals are face seals.

18. The fluid swivel of claim 14, further comprising:
second upper and lower annular seal recesses which are substantially adjacent to the first upper and lower annular seal recesses but are formed at an increased diameter in the outer housing, the increased diameter is less than the annular passage outer diameter; and second upper and lower dynamic seals disposed respectively in the second upper and lower annular seal recesses.

19. A fluid swivel comprising:

a stationary inner housing assembly;

a rotatable outer housing operatively connected to the stationary inner housing assembly and defining upper and lower annular seal recesses, the outer housing having a radially inward-facing annular surface defining an innermost diameter of the outer housing and having an annular passage that has upper and lower surfaces;

upper and lower seals positioned between the stationary inner housing assembly and the rotatable outer housing and disposed in the upper and lower annular seal recesses; and an inner housing passage disposed in the stationary inner housing assembly and arranged to provide fluid having a fluid pressure (P) to the annular passage, the fluid allowed to fill a small space between the inner housing assembly and the outer housing from the radially inward-facing annular surface to the upper and lower seals, the fluid exerting a first axial force ($Fv_1$) on an outer upper surface of the outer housing, and a second axial force ($Fv_2$) on the upper surface of the annular passage, the second axial force ($Fv_2$) having a greater magnitude than the first axial force ($Fv_1$) so that the outer housing deflects axially upward, wherein the upper seal defines a circumferential axially-facing outer upper surface area of the outer housing from the innermost diameter to the upper annular seal recess, and the magnitude of the first axial force ($Fv_1$) is the product of the circumferential axially-facing outer upper surface area times the fluid pressure (P), and the annular passage has an upper circumferential passage area defined by the passage width, and the magnitude of the second axial force ($Fv_2$) is the product of the upper circumferential passage area times the fluid pressure (P).

20. The fluid swivel of claim 19, wherein the fluid exerts a third axial force ($Fv_1$) on an outer lower surface of the outer housing, and a fourth axial force ($Fv_2$) on the lower surface of the annular passage, the fourth axial force ($Fv_2$) having a greater magnitude than the third axial force ($Fv_1$) so that the outer housing deflects axially downward.

21. The fluid swivel of claim 20, wherein the third axial force is equal to the first axial force but in the opposite direction and the fourth axial force is equal to the second axial force but in the opposite direction.

22. The fluid swivel of claim 19, wherein the outer housing and the stationary inner housing assembly are separated by at least two axial thrust bearings and at least one radial bearing.

23. The fluid swivel of claim 19, further comprising backup seals, secondary seals, and backup secondary seals, positioned between the outer housing and the stationary inner housing assembly.

* * * * *